US011828737B2

(12) United States Patent
Tamaoki et al.

(10) Patent No.: US 11,828,737 B2
(45) Date of Patent: Nov. 28, 2023

(54) PREPARATIVE LIQUID CHROMATOGRAPH

(71) Applicant: SHIMADZU CORPORATION, Kyoto (JP)

(72) Inventors: Soichiro Tamaoki, Kyoto (JP); Tsutomu Okoba, Kyoto (JP); Takayuki Iriki, Kyoto (JP); Shiori Ueda, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 565 days.

(21) Appl. No.: 16/499,413

(22) PCT Filed: Apr. 5, 2017

(86) PCT No.: PCT/JP2017/014215
§ 371 (c)(1),
(2) Date: Sep. 30, 2019

(87) PCT Pub. No.: WO2018/185872
PCT Pub. Date: Oct. 11, 2018

(65) Prior Publication Data
US 2020/0033303 A1 Jan. 30, 2020

(51) Int. Cl.
G01N 30/24 (2006.01)
G01N 30/86 (2006.01)
G01N 30/02 (2006.01)

(52) U.S. Cl.
CPC ......... G01N 30/24 (2013.01); G01N 30/8631 (2013.01); G01N 2030/027 (2013.01)

(58) Field of Classification Search
CPC ............... G01N 30/24; G01N 30/8631; G01N 2030/027; G01N 30/8658; G01N 30/82
See application file for complete search history.

(56) References Cited

U.S. PATENT DOCUMENTS 5,670,054 A * 9/1997 Kibbey ................. G01N 30/82
210/659
2003/0094415 A1* 5/2003 Tanimura ........... B01D 15/1885
210/656

FOREIGN PATENT DOCUMENTS

DE 112015000770 T5 * 10/2016 ............. B01D 15/08
DE 112015000770 T5 * 10/2016
JP 2008076243 A 4/2008
(Continued)

OTHER PUBLICATIONS

Chinese Office Action for corresponding Chinese Patent Application No. 201780087235.0 dated Jan. 22, 2021.
(Continued)

Primary Examiner — Daniel S Larkin
(74) Attorney, Agent, or Firm — Renner, Otto, Boisselle & Sklar, LLP

(57) ABSTRACT

In a preparative liquid chromatograph, a control device for controlling at least operation of a sample injection part includes a holding part for holding a chromatogram-for-setting created in advance for a sample to be analyzed, and an injection program creating part configured to create an injection program that defines timings at which injection operations are executed based on the chromatogram-for-setting, so that, in the case where the number of injections in a multiple injection mode is set, a peak of a chromatogram of the sample to be analyzed injected in each injection operation does not overlap a peak of a chromatogram of the sample to be analyzed injected in another injection operation.

4 Claims, 4 Drawing Sheets

(56) References Cited

FOREIGN PATENT DOCUMENTS

| | | |
|---|---|---|
| JP | 2012-173148 A | 9/2012 |
| JP | 2012-193999 A | 10/2012 |
| JP | 2012193999 A * | 10/2012 |

OTHER PUBLICATIONS

International Search Report for corresponding Application No. PCT/JP2017/014215, dated Jul. 4, 2017.
Written Opinion for corresponding Application No. PCT/JP2017/014215, dated Jul. 4, 2017.

* cited by examiner

PREPARATIVE LIQUID CHROMATOGRAPH

TECHNICAL FIELD

The present invention relates to a preparative liquid chromatograph in which a sample is separated into components using an analysis column, and the separated sample components are fractionated and collected by a fraction collector.

BACKGROUND ART

A preparative liquid chromatograph, in which a plurality of components containing a sample are separated and collected using a liquid chromatograph typified by a high performance liquid chromatograph (see, for example, Patent Document 1). The preparative liquid chromatograph includes a chromatograph part equipped with a liquid transfer device for transferring a mobile phase, an analysis column, a detector, and the like, a fraction collector provided on a rear stage side of the chromatograph part, and a control device that controls operation of these. The fraction collector is configured to operate based on a signal of the detector in the chromatograph part, and sample components temporally separated by the analysis column are fractionated and collected by the fraction collector.

PRIOR ART DOCUMENTS

Patent Documents

Patent Document 1: Japanese Patent Laid-open Publication No. 2012-193999

SUMMARY OF THE INVENTION

Problems to be Solved by the Invention

A preparative liquid chromatograph is required to inject a large amount of sample into an analysis channel at one time, and separate the sample into components. However, an amount of sample that can be injected into the analysis channel at one time is limited, and an upper limit of such an amount varies depending on a pump flow rate and column performance. Therefore, in a case where there is a sample in an amount exceeding the upper limit, the same sample is divided and injected into the analysis channel a plurality of times.

In a case where a sample is divided and injected a plurality of times, it has been necessary that the user check an appearing position of a peak by performing sample injection on a trial basis, and create an injection program so as to set timings of the sample injections in such a manner that peak positions that appear by injections do not overlap. Further, in a case where the user creates an injection program, if a time interval between injections is too long, the time required for fractionation cycle time will be long.

In view of the above, an object of the present invention is to make it possible to easily create an injection program that defines a timing of each injection operation in a case where injection operation into an analysis channel for the same sample is performed a plurality of times.

Solutions to the Problems

The preparative liquid chromatograph according to the present invention includes a liquid transfer device which transfers a mobile phase, an analysis channel through which the mobile phase transferred by the liquid transfer device flows, a sample injection part which injects a sample into the analysis channel, an analysis column which separates the sample into individual components downstream of the sample injection part on the analysis channel, a detector which detects the components separated by the analysis column on the analysis channel downstream of the analysis column, a fraction collector which collects the components flowing out of the detector on an outlet side of the detector, and a control device configured to control operation of at least the sample injection part. The control device includes a holding part which holds a chromatogram-for-setting preliminary created for a sample to be analyzed, and an injection program creating part configured to create an injection program based on the chromatogram-for-setting in the case where the number of injections in a multiple injection mode is set, the multiple injection mode is a mode in which an injection operation into the analysis channel by the sample injection part is executed by being divided into a plurality of times for the same sample to be analyzed, the injection program defines timings at which each of the injection operations are executed so that a peak of a chromatogram of the sample to be analyzed in each of the injection operations does not overlap a peak of a chromatogram of the sample to be analyzed injected in another one of the injection operations.

In a preferred aspect of the injection program creating part, the injection program creating part is configured to create the injection program, so that a time interval between a last peak of a chromatogram of the sample to be analyzed injected in the injection operation executed earlier and a first peak of a chromatogram of the sample to be analyzed injected in the injection operation executed immediately thereafter becomes a predetermined time interval. The "last peak" means a peak having a latest appearance time in the chromatogram, and the "first peak" means a peak having an earliest appearance time in the chromatogram.

The above "predetermined time interval" has a meaning as a margin for preventing appearance times of a last peak of the chromatogram of the sample injected earlier and a first peak of the chromatogram of the sample injected immediately after that from overlapping. This margin may be a fixed value (default value) or a value optionally set by the user. The shorter this "margin", the shorter the time required to complete all injection operations. However, an appearance position of a peak at the time of actual analysis may fluctuate from an appearance position on a chromatogram-for-setting created in advance due to a fluctuation of analysis conditions, such as room temperature. For this reason, if the above-mentioned margin is too short (for example, 0 seconds), a situation where appearance times of peaks overlap may occur. Therefore, the above-mentioned "predetermined time interval" is preferably set in consideration of a fluctuation of an appearance time of a peak.

Effects of the Invention

In the preparative liquid chromatograph of the present invention, a control device for controlling operation of at least a sample injection part includes a holding part for holding a chromatogram-for-setting preliminary created for a sample to be analyzed, and an injection program creating part configured to create an injection program that defines timings at which injection operations are executed based on the chromatogram-for-setting, so that, when the number of injections in a multiple injection mode is set, a peak of a chromatogram of the sample to be analyzed injected in each injection operation does not overlap a peak of a chromatogram of the sample to be analyzed injected in another injection operation. Accordingly, the injection program is automatically created only by the user setting the number of injections. In this manner, the user no longer needs to create an injection program while checking a chromatogram obtained by a preliminary analysis, and the user's setting work is simplified when sample injection is performed in the multiple injection mode.

EMBODIMENT OF THE INVENTION

Hereinafter, an embodiment of a preparative liquid chromatograph of the present invention will be described using the drawings.

Figure 1:
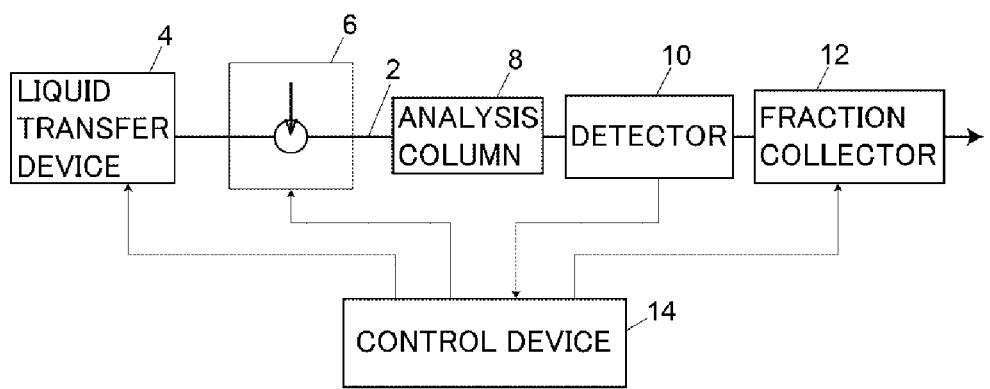
FIG. 1 is a schematic channel configuration diagram showing an embodiment of a preparative liquid chromatograph.

FIG. 1 schematically shows a configuration of the preparative liquid chromatograph.

The preparative liquid chromatograph includes a liquid transfer device 4 for transferring a mobile phase in an analysis channel 2, a sample injection part 6 for injecting a sample into the analysis channel 2, an analysis column 8 for separating the sample into components, a detector 10 for detecting the sample components separated by the analysis column 8, a fraction collector 12 for fractionating and collecting the sample components separated by the analysis column 8, and a control device 14 that performs operation control of the entire preparative liquid chromatograph.

The sample injection part 6 is provided downstream of the liquid transfer device 4 on the analysis channel 2. The sample injection part 6 is an autosampler configured to automatically collect a sample and inject the sample into the analysis channel 2 through which a mobile phase from the liquid transfer device 4 flows. The analysis column 8 is provided downstream of the sample injection part 6 on the analysis channel 2. The sample injected by the sample injection part 6 is carried to the analysis column 8 by the mobile phase from the liquid transfer device 4 and separated into components.

The detector 10 is provided downstream of the analysis column 8 on the analysis channel 2, and the sample components separated by the analysis column 8 appear as peaks in a detection waveform obtained by the detector 10. The fraction collector 12 is provided on a rear stage of the detector 10. The operation of the fraction collector 12 is controlled by the control device 14.

The control device 14 controls the operation of the liquid transfer device 4, the sample injection part 6, a column oven (not shown) for controlling the temperature of the analysis column 8, and the fraction collector 12. The control device 14 is realized by a computer dedicated to the preparative liquid chromatograph or a general-purpose personal computer.

The fraction collector 12 may have any configuration as long as it can fractionate and collect a portion containing a desired sample component in the mobile phase flowing out of the detector 10. For example, the fraction collector 12 may be configured in such a way that a channel from an outlet of the detector 10 is connected to a channel switching valve, and switching of the channel switching valve leads the mobile phase containing the desired sample component to an individual container. Further, the fraction collector 12 may be configured in such a way that the channel from the outlet of the detector 10 is connected to a movable probe, and the probe is moved so that the mobile phase containing the desired sample component is dropped from a tip of the probe to an individual container.

The control device 14 detects a peak corresponding to a desired sample component (to be fractionated and collected as designated by the user) from a signal waveform obtained by the detector 10, and controls operation of the fraction collector 12 so that the mobile phase corresponding to the peak portion is fractionated and collected. In order to detect a peak corresponding to a desired sample component from a signal waveform obtained by the detector 10, the control device 14 holds a fractionation parameter which is a threshold for detecting a start point and an end point of the peak.

In this preparative liquid chromatograph, a multiple injection mode can be selected as a mode relating to a sample injection system. The multiple injection mode is a mode in which the same sample is divided into a plurality of portions and injected into the analysis channel 2 a plurality of times. The multiple injection mode is selected in a case where an amount of a sample to be analyzed exceeds an upper limit of an amount that the sample injection part 6 can inject into the analysis channel 2 at one time.

When the multiple injection mode is selected, the sample injection part 6 executes injection operation of injecting the sample to be analyzed into the analysis channel 2 a set number of times. The control device 14 has a function of automatically creating an injection program that defines a timing of each injection operation by the sample injection part 6 when the user selects the multiple injection mode and sets the number of injections.

Figure 2:
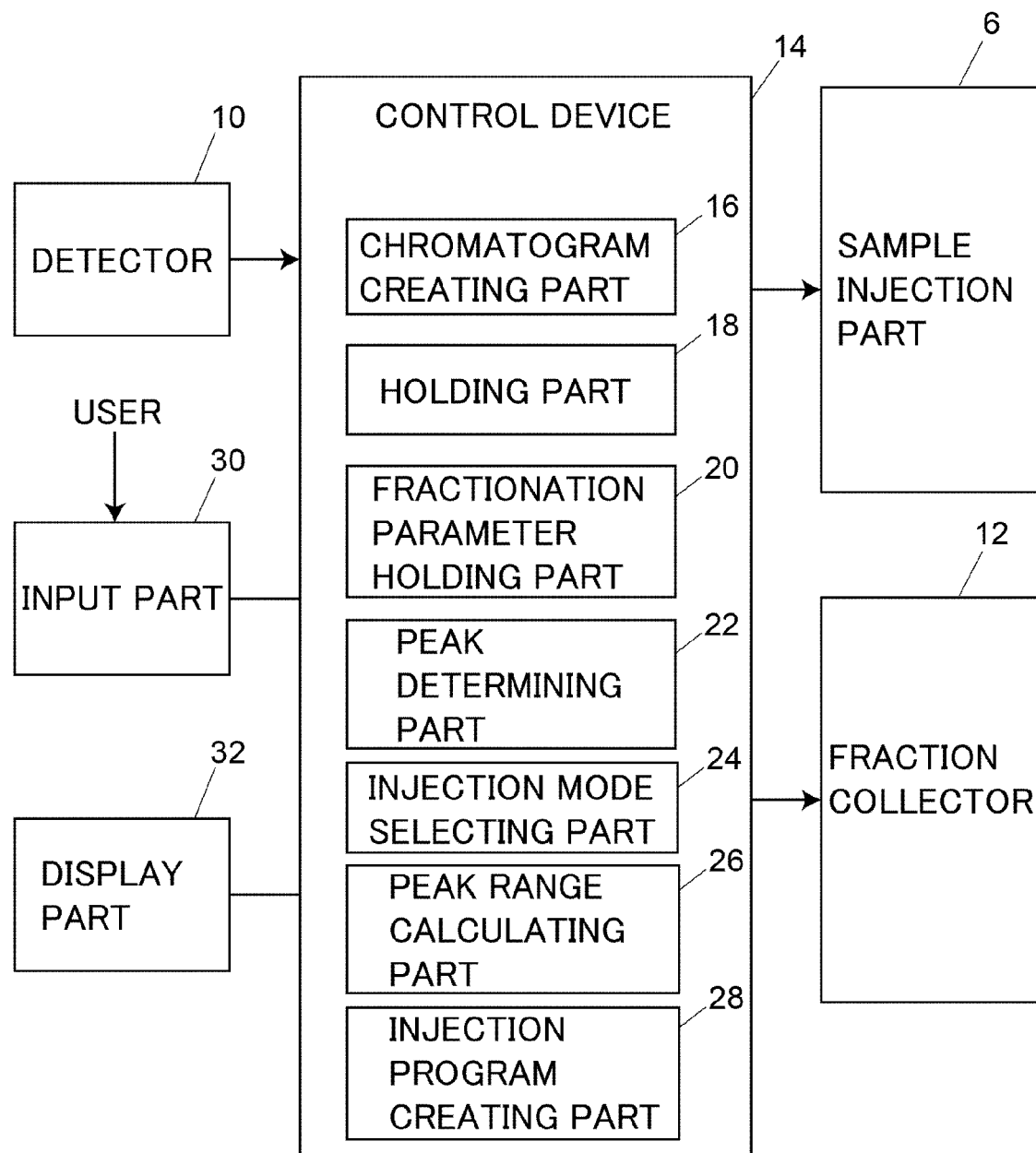
FIG. 2 is a block diagram schematically showing a configuration of a control device of the embodiment.

The functions of the control device 14 will be described with reference to FIG. 2.

The control device 14 includes a chromatogram creating part 16, a holding part 18, a fractionation parameter holding part 20, a peak determining part 22, an injection mode selecting part 24, a peak range calculating part 26, and an injection program creating part 28. The control device 14 is connected to an input part 30, such as a keyboard and a mouse, and a display part 32, such as a liquid crystal display. The user can input necessary information to the control device 14 through the input part 30. The display part 32 displays various pieces of information, such as a chromatogram created based on a signal from the detector 10.

The chromatogram creating part 16 is configured to create a chromatogram of a sample based on a signal from the detector 10. Normally, before fractionation and collection of sample components are performed, a target sample is injected into the analysis channel 2 (see FIG. 1), and a preliminary analysis of the sample is performed to create a chromatogram. The chromatogram created by the chromatogram creating part 16 in the preliminary analysis is held in the holding part 18 as a chromatogram-for-setting. The holding part 18 is a storage area for holding the chromatogram-for-setting.

The chromatogram-for-setting is used to set a fractionation parameter which is a threshold for detecting a peak of a sample component to be fractionated and collected, and also to create an injection program described later. The fractionation parameter holding part 20 is a storage area for holding the set fractionation parameter.

The peak determining part 22 is configured to determine a start point and an end point of a peak in the chromatogram-for-setting or a chromatogram acquired in actual analysis by using the fractionation parameter stored in the fractionation parameter holding part 20 to detect a peak.

The injection mode selecting part 24 is configured to allow the user to select an injection mode of a sample. As the injection modes, there are a normal injection mode in which the entire amount of a sample (the same sample) is injected into the analysis channel 2 (see FIG. 1) by one injection operation, and a multiple injection mode for dividing the sample into a plurality of portions and injecting them into the analysis channel 2 by a plurality of injection operations. The injection mode selecting part 24 is configured to allow the user to set the number of injections when the user selects the multiple injection mode. The control device 14 controls the operation of the sample injection part 6 so as to inject the entire amount of the sample into the analysis channel 2 by the number of injection operations set by the user.

The peak range calculating part 26 is configured to calculate a peak range Tp in a chromatogram-for-setting used for creating an injection program described later. The peak range Tp means time from when a start point of a first peak that has an earliest appearance time is detected to when an end point of a last peak that has a latest appearance time is detected among peaks appearing in the chromatogram-for-setting. The detection of each peak in the chromatogram-for-setting is performed by the peak determining part 22 using the fractionation parameter held in the fractionation parameter holding part 20.

The chromatogram creating part 16, the peak determining part 22, the injection mode selecting part 24, the peak range calculating part 26, and the injection program creating part 28 are functions obtained by the arithmetic element provided in the control device 14 executing a program.

Figure 4:
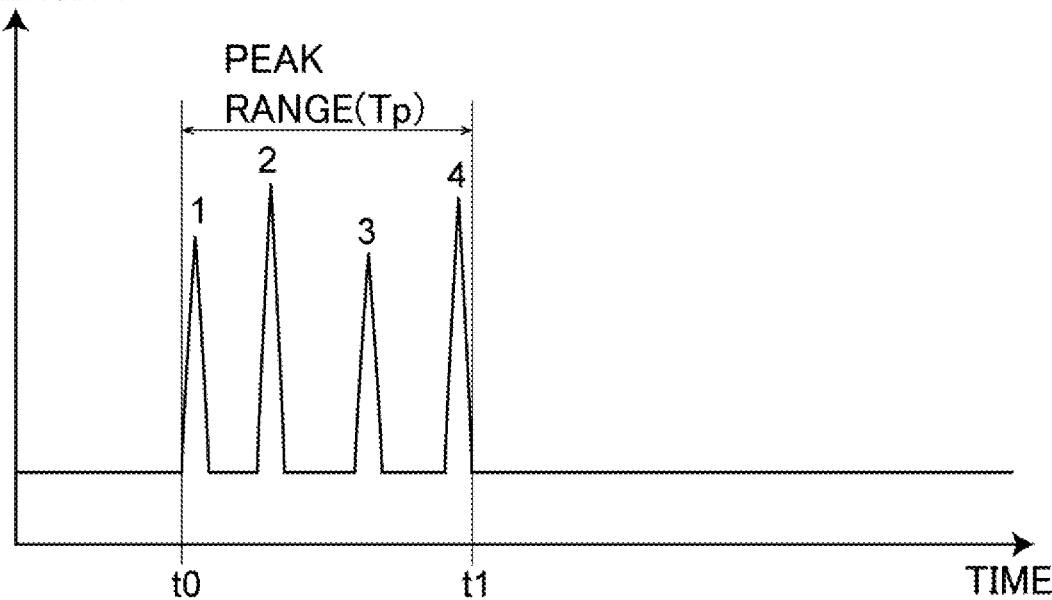
FIG. 4 is an example of a chromatogram-for-setting.

Assuming that the chromatogram-for-setting has, for example, a waveform shown in FIG. 4, peaks 1 to 4 are detected by the peak determining part 22. Accordingly, the peak range Tp is a range from time t0 at which a start point of the first peak 1 is detected to time t1 at which an end point of the last peak 4 is detected. That is, $$Tp = t1 - t0$$

is established.

The injection program creating part 28 is configured to create an injection program that defines at what timing the sample injection part 6 executes each injection operation of the sample when the user selects the multiple injection mode and sets the number of injections. The injection program is created using the peak range Tp calculated by the peak range calculator 26 so that the peak ranges Tp of the chromatograms of the sample injected in injection operations do not overlap. Specifically, the interval (injection interval) Tin between each injection operation is determined in such a way that a constant time interval Δt is generated between an end point of a last peak of a chromatogram of a sample injected in an injection operation performed earlier and a start point of a first peak of a chromatogram of the sample injected in an injection operation performed immediately after the injection operation performed earlier.

Since the appearance time of each peak of the chromatogram-for-setting is data obtained when the preliminary analysis is performed, it may be deviated from the appearance time of the chromatogram-for-setting depending on conditions of an actual analysis. The time interval Δt has a meaning as a margin for ensuring that the peak ranges Tp of the chromatograms of the sample injected in injection operations do not overlap even if such a deviation occurs. The margin Δt may be a fixed value or may be set optionally by the user.

Figure 5:
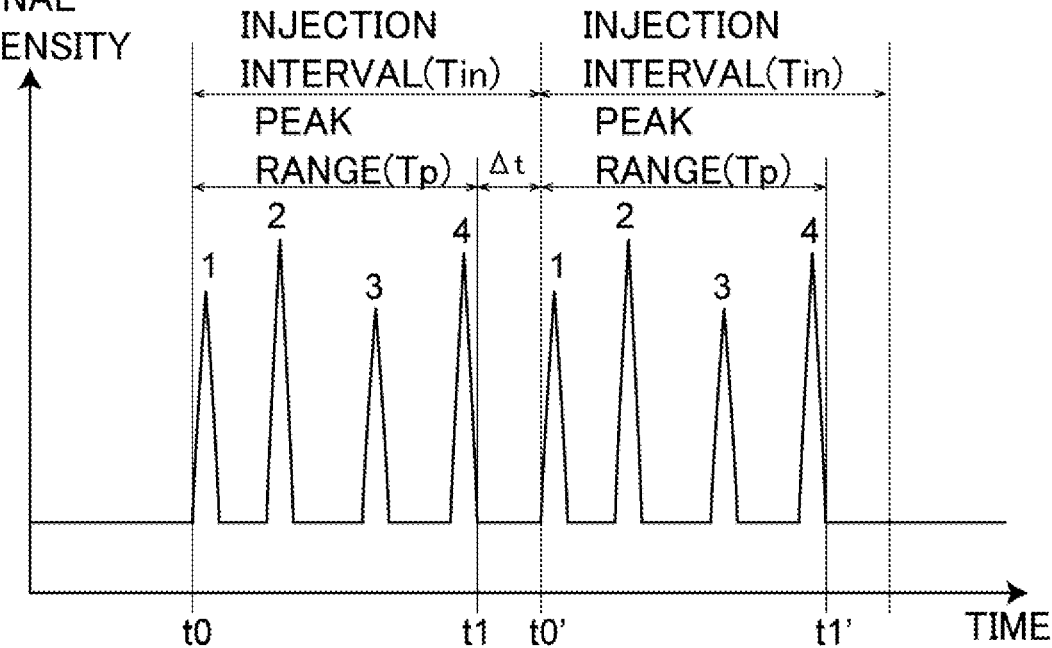
FIG. 5 is an example of a chromatogram assumed to be obtained by a created injection program.

In a case where an injection program is created using the chromatogram-for-setting of FIG. 4, the injection interval Tin is calculated in such a way that the fixed time interval Δt occurs between the time t1 of the end point of the last peak 4 of the chromatogram of the sample injected in the injection operation performed earlier and the time t0 of the start point of the first peak 1 of the chromatogram of the sample injected in the injection operation performed immediately after the injection operation performed earlier as shown in FIG. 5. A time interval between an injection time of the injection operation performed earlier and an injection time of the injection operation performed immediately after that is set to the calculated injection interval Tin, and an injection program is automatically created so that the same sample injection operation is performed by being divided into the number of injections set by user operation. The above injection interval Tin can be expressed as $$Tin = Tp + \Delta t.$$

Figure 3:
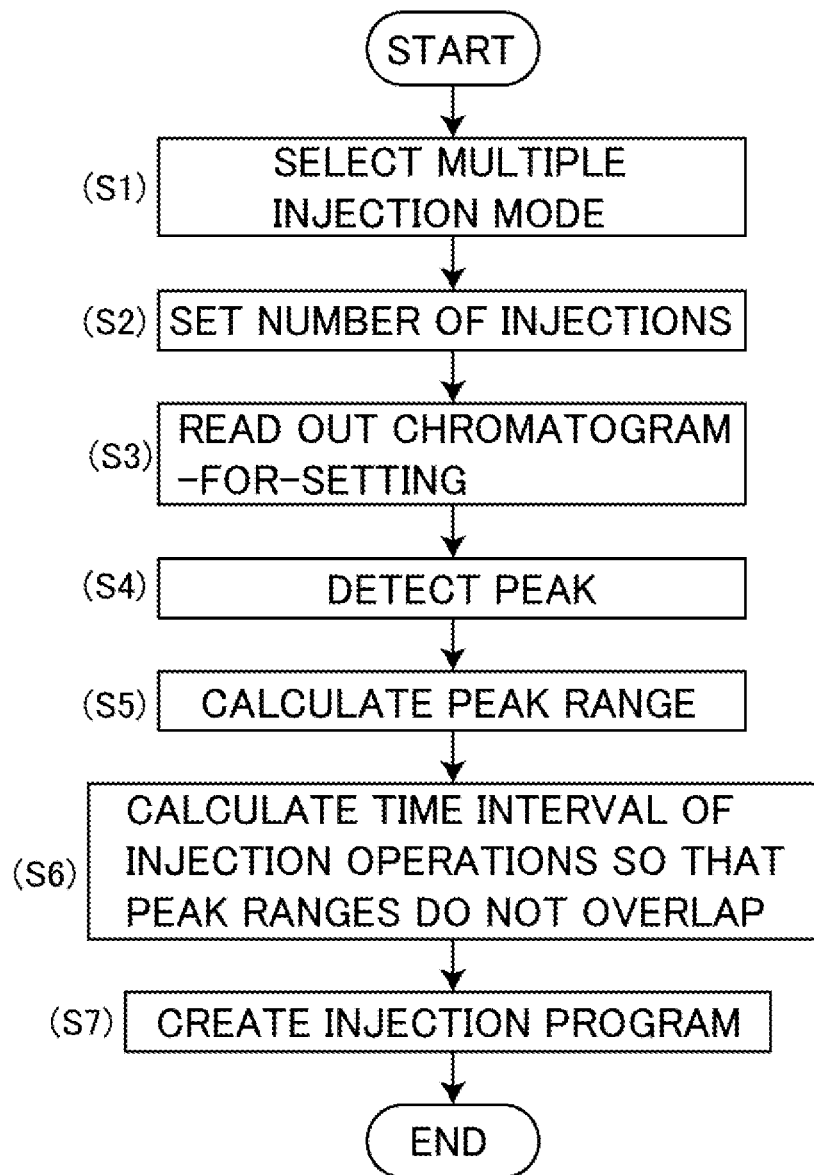
FIG. 3 is a flowchart showing operation at the time a multiple injection mode of the embodiment is selected.

The injection program creation operation by the control device 14 will be described using the flowchart of FIG. 3 together with FIG. 2.

When the user selects the multiple injection mode and sets the number of injections (Steps S1 and S2), the chromatogram-for-setting of the sample to be analyzed held in the holding part 18 is read out (Step S3). The peak determining part 22 detects a peak appearing in the read chromatogram-for-setting using the fractionation parameter stored in the fractionation parameter holding part 20 (Step S4). Note that the peak can also be corrected as appropriate by user operation.

The peak range calculating part 26 calculates a peak range by obtaining a difference between a time of a start point of a first peak and a time of an end point of a last peak among the peaks detected by the peak determining part (Step S5). The injection program creating part 28 calculates the injection interval Tin which is a time interval between injection operations so that the peak ranges Tp of the chromatogram of the sample injected in injection operations do not overlap (Step S6), and creates an injection program so that injection operations as many as the number of times set in the injection interval Tin are performed (Step S7).

DESCRIPTION OF REFERENCE SIGNS

2: Analysis channel
4: Liquid transfer device
6: Sample injection part
8: Analysis column
10: Detector
12: Fraction collector
14: Control device
16: Chromatogram creating part
18: Holding part
20: Fractionation parameter holding part
22: Peak determining part
24: Injection mode selecting part
26: Peak range calculating part 28: Injection program creating part
30: Input part
32: Display part

The invention claimed is:

1. A preparative liquid chromatograph, comprising:
a liquid transfer device which transfers a mobile phase;
an analysis channel through which the mobile phase transferred by the liquid transfer device flows;
a sample injection part which injects a sample into the analysis channel;
an analysis column which separates the sample into individual components downstream of the sample injection part on the analysis channel;
a detector which detects the components separated by the analysis column on the analysis channel downstream of the analysis column;
a fraction collector which collects the components flowing out of the detector on an outlet side of the detector; and
a control device configured to control operation of at least the sample injection part, wherein
the control device includes
a holding part which holds a preliminary chromatogram created for a sample to be analyzed,
an injection sequence creating unit configured to create an injection sequence based on the preliminary chromatogram in the case where an injection operation into the analysis channel by the sample injection part is executed by being divided into a plurality of times for the same sample to be analyzed, the injection sequence defines an injection interval between each of the injection operations so that a peak of a chromatogram of the sample to be analyzed in each of the injection operations does not overlap a peak of a chromatogram of the sample to be analyzed in another one of the injection operations, and
a peak range calculating part configured to calculate a peak range which is a time interval from a time at which a start point of a first peak in the preliminary chromatogram is detected to a time at which an end point of a last peak in the preliminary chromatogram is detected,
wherein
the injection sequence creating unit is configured to calculate the injection interval by adding a predetermined time to the peak range.

2. The preparative liquid chromatograph according to claim 1, wherein
the predetermined time interval is set in consideration of a fluctuation of an appearance time of a peak.

3. The preparative liquid chromatograph according to claim 1, wherein
the injection sequence creating unit is configured to create the injection sequence based on the preliminary chromatogram when the number of injections in a multiple injection mode is set.

4. The preparative liquid chromatograph according to claim 1, wherein
the peak range calculating part is configured to calculate the peak range automatically based on the preliminary chromatogram, and
the injection sequence creating unit is configured to calculate the injection interval automatically based on the calculated peak range, and to create the injection sequence automatically based on the calculated injection interval.

* * * * *